(12) United States Patent
Boquet et al.

(10) Patent No.: US 12,124,858 B2
(45) Date of Patent: Oct. 22, 2024

(54) SYSTEM FOR SOFTWARE MODULE DEVELOPMENT

(71) Applicant: ELEMENT AI INC., Montreal (CA)

(72) Inventors: Thomas Boquet, Montreal (CA); Nathan Schucher, Montreal (CA); Jonas Fonseca, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 26 days.

(21) Appl. No.: 17/499,472

(22) Filed: Oct. 12, 2021

(65) Prior Publication Data

US 2022/0043660 A1 Feb. 10, 2022

Related U.S. Application Data

(63) Continuation of application No. PCT/CA2020/050462, filed on Apr. 8, 2020.
(Continued)

(51) Int. Cl.
*G06F 9/445* (2018.01)
*G06F 8/71* (2018.01)

(52) U.S. Cl.
CPC ............ *G06F 9/44505* (2013.01); *G06F 8/71* (2013.01)

(58) Field of Classification Search
CPC ............................... G06F 8/71; G06F 9/44505
See application file for complete search history.

(56) References Cited

U.S. PATENT DOCUMENTS 7,194,738 B2 * 3/2007 Lin .......................... G06F 8/63
717/177
8,001,083 B1 * 8/2011 Offer ........................ G06F 8/71
707/636
(Continued)

FOREIGN PATENT DOCUMENTS

CN 105095068 A 11/2015
JP 2012088901 A 5/2012
(Continued)

OTHER PUBLICATIONS

International Search Report and Written Opinion with regard to the International Patent Application No. PCT/CA2020/050462 mailed Jun. 18, 2020.
(Continued)

*Primary Examiner* — Douglas M Slachta
(74) *Attorney, Agent, or Firm* — BCF LLP

(57) ABSTRACT

Systems and methods for use in software module development. A configuration file and a process agent module operate cooperatively in conjunction with a computer system to provision one or more execution environments to implement one or more instances of a user's software module in development. The configuration file contains the hardware and software configuration that defines the limits and capabilities of the execution environment as well as parameters needed by the software module. The process agent launches the execution environment and ensures that the software module executing in the execution environment has access to the resources set out in the configuration file. Once execution of the software module is complete, performance results are then passed to the process agent for collation and analysis. These results can then be used to determine which implementation of the software module performs best.

19 Claims, 1 Drawing Sheet

Related U.S. Application Data

(60) Provisional application No. 62/833,193, filed on Apr. 12, 2019.

(56) References Cited

U.S. PATENT DOCUMENTS

| | | | | |
|---|---|---|---|---|
| 8,171,141 | B1* | 5/2012 | Offer | G06F 9/5077 709/226 |
| 9,015,180 | B1* | 4/2015 | Offer | G06F 16/14 707/758 |
| 9,703,550 | B1* | 7/2017 | McCann | G06F 9/44505 |
| 9,858,165 | B2* | 1/2018 | Vaidya | G06F 11/3409 |
| 9,875,174 | B1* | 1/2018 | Brandwine | G06F 11/3409 |
| 10,091,055 | B2* | 10/2018 | Sundaram | H04L 41/0806 |
| 10,152,387 | B1* | 12/2018 | Chakraborty | G06F 11/1469 |
| 11,140,035 | B2* | 10/2021 | Mutnuru | H04L 41/0813 |
| 2008/0301674 | A1 | 12/2008 | Faus | |
| 2010/0257513 | A1* | 10/2010 | Thirumalai | G06F 16/2365 717/134 |
| 2011/0088022 | A1* | 4/2011 | Kruglick | G06F 8/443 717/153 |
| 2012/0060146 | A1* | 3/2012 | Maurer | G06F 9/45504 717/110 |
| 2012/0310618 | A1* | 12/2012 | B'Far | G06F 11/3447 703/13 |
| 2013/0138783 | A1* | 5/2013 | Mallur | G06F 8/63 709/221 |
| 2013/0239106 | A1 | 9/2013 | Srinivasan et al. | |
| 2013/0290541 | A1* | 10/2013 | Hatasaki | G06F 3/067 709/226 |
| 2014/0245292 | A1 | 8/2014 | Balani et al. | |
| 2015/0269201 | A1* | 9/2015 | Caso | H04L 67/1095 707/641 |
| 2015/0358392 | A1* | 12/2015 | Ramalingam | H04L 67/131 709/203 |
| 2015/0379034 | A1* | 12/2015 | Apte | G06F 9/44505 707/754 |
| 2016/0019085 | A1* | 1/2016 | Khandekar | G06F 9/45558 718/1 |
| 2016/0034285 | A1* | 2/2016 | Wang | G06F 16/9574 717/121 |
| 2016/0241438 | A1 | 8/2016 | Sundaram et al. | |
| 2017/0315795 | A1* | 11/2017 | Keller | G06F 11/3006 |
| 2018/0032866 | A1* | 2/2018 | Son | G06N 3/04 |
| 2018/0330237 | A1* | 11/2018 | Yoshiyama | G06N 3/045 |
| 2019/0294424 | A1* | 9/2019 | Joshi | G06F 8/71 |
| 2020/0228402 | A1* | 7/2020 | Parker | G06F 9/45533 |
| 2021/0081304 | A1* | 3/2021 | Masis | G06F 9/45533 |

FOREIGN PATENT DOCUMENTS

| | | |
|---|---|---|
| JP | 2014021754 A | 2/2014 |
| JP | 2017058992 A | 3/2017 |
| JP | 2018151969 A | 9/2018 |
| JP | 2019057088 A | 4/2019 |
| WO | 2019/018375 A1 | 1/2019 |

OTHER PUBLICATIONS

Search Report with regard to the counterpart Patent Application No. EP20788251.5 completed Nov. 28, 2022.

Peng et al., "Machine Learning Hyperparameter Fine Tuning Service on Dynamic Cloud Resource Allocation System—taking Heart Sounds as an Example", Big Data and Artificial Intelligence, ACM, Dec. 2018, pp. 22-28.

Gardner et al., "MORF: A Framework for MOOC Predictive Modeling and Replication At Scale", arxiv.org, Cornell University Library, Jan. 2018, 10 pages.

Sung et al., "NSML: A Machine Learning Platform That Enables You to Focus on Your Models", arxiv.org, Cornell University Library, Dec. 2017, pp. 1-8.

Wu et al., "A Comparative Measurement Study of Deep Learning as a Service Framework", arxiv.org, Cornell University Library, Oct. 2018, pp. 1-15.

Office Action with regard to the counterpart JP Patent Application No. 2021-560736 mailed Mar. 26, 2024.

Office Action with regard to te counterpart CN Patent Application No. 202080028324X issued Jun. 6, 2024.

* cited by examiner

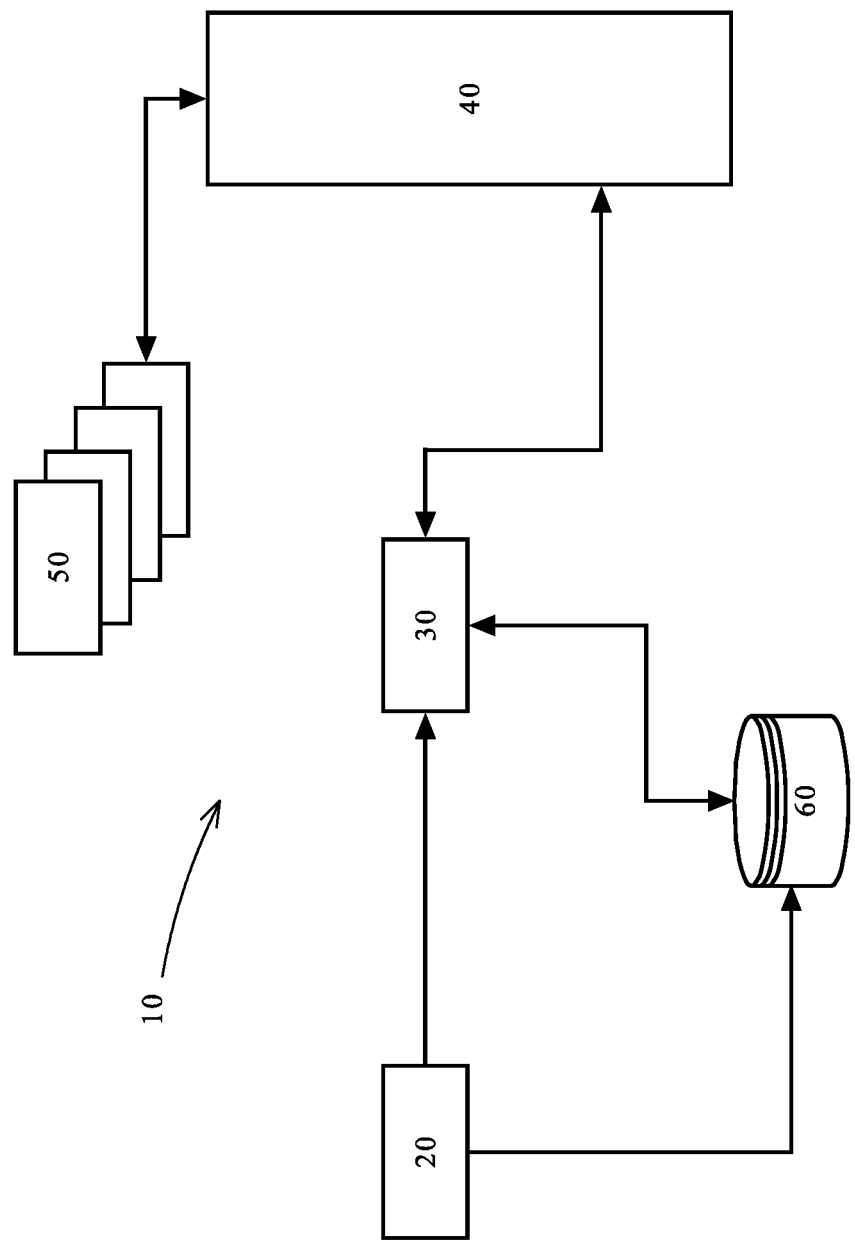

SYSTEM FOR SOFTWARE MODULE DEVELOPMENT

CROSS-REFERENCE TO RELATED APPLICATIONS

This application is a Continuation of PCT Application PCT/CA2020/050462, filed on Apr. 8, 2020, which claims the benefit of U.S. Provisional Application 62/833,193, filed on Apr. 12, 2019, both of which are incorporated herein by reference in their entirety.

TECHNICAL FIELD

The present invention relates to software development. More specifically, the present invention relates to systems and methods for use in developing software modules.

BACKGROUND

The explosion in interest and developments in artificial intelligence and, more specifically, in machine learning and neural networks in the past few years has led to a burgeoning need for systems for use in developing such technology. To this end, more and more computer scientists, developers, and engineers are pushing the boundaries of technology to arrive at better and better systems. However, this has also led to a number of potential problems for these scientists, engineers, and developers.

When developing software, different configurations will yield different results in terms of performance. As such, to optimize performance of the software being developed, the developer will need to keep track of these different configurations and ensure that the configurations that provided the best results are kept. However, some software may have dozens if not hundreds of configurations and keeping track of such a number of parameters and settings is onerous at best. As well, the configuration of the system operating the software will also affect the software's performance. Accordingly, the configuration of the system will also need to be kept track of to ensure that the various configurations of the software are all competing on a level playing field. Again, this may become an onerous task.

It should be clear that all of the above becomes even more challenging as software development may be executed using various forms of execution environments. To ensure that the various configurations of the software being developed are all being assessed correctly, the configurations of the execution environments executing such software will have to be as identical as possible to one another.

The above issue is even more acute when developing neural networks and machine learning systems. The hyper parameters used by such systems can easily run into the hundreds and ensuring that each version of the software system being developed is run on an identical execution environment may, at best, be difficult. Not only that but each change in the hyper parameters being used may yield different results and, accordingly, the performance of each system will need to be collated, tracked, and managed to ensure that the correct parameters settings are associated with the correct performance metrics.

Accordingly, there is therefore a need for systems and/or methods that address the above issues. Preferably, such methods or systems mitigate if not overcome the above issues and, also preferably, such systems or methods are also easy for developers and/or researchers to use.

SUMMARY

The present invention provides systems and methods for use in software module development. A configuration file and a process agent module operate cooperatively in conjunction with a computer system to provision one or more execution environments to implement one or more instances of a user's software module in development. The configuration file contains the hardware and software configuration that defines the limits and capabilities of the execution environment as well as parameters needed by the software module. The process agent launches the execution environment and ensures that the software module executing in the execution environment has access to the resources set out in the configuration file. Once execution of the software module is complete, performance results are then passed to the process agent for collation and analysis. These results can then be used to determine which implementation of the software module performs best. In one specific implementation, the process agent is a virtual machine itself and manages the configuration, provisioning, and launching of other virtual machines/execution environments and other jobs.

In a first aspect, the present invention provides a system for provisioning and launching one or more instances of a software module, the system comprising:
- a configuration file detailing a hardware and a software configuration for use in implementing at least one instance of said software module;
- a process agent module for use in configuring at least one computer system to implement said at least one instance of said software module, said process agent using said configuration file to configure said at least one computer system;

wherein
- said configuration file is stored in data storage such that said file is retrievable so that every implementation of said software module uses said configuration file;
- said configuration file is uniquely identified by an identifier, said identifier being uniquely associated with said software module.

In a second aspect, the present invention provides a system for launching multiple instances of a software module, the system comprising:
- a configuration file detailing configurations for use in implementing said multiple instances of said software module;
- a process agent module for use in configuring at least one computer system to implement said multiple instances of said software module, said process agent using said configuration file to configure said at least one computer system;

wherein
- said configuration file is uniquely identified by an identifier, said identifier being uniquely associated with said software module.

BRIEF DESCRIPTION OF THE DRAWINGS

The embodiments of the present invention will now be described by reference to the following figures, in which identical reference numerals in different figures indicate identical elements and in which:

FIG. 1 is a block diagram illustrating the components in a system according to one aspect of the present invention.

DETAILED DESCRIPTION

In one aspect, the present invention provides a system that includes a configuration file and a process agent module.

These two cooperate to address the issues noted above. In operation, the configuration file is prepared by a user and is uniquely associated with a software module that the user is preparing/developing. The configuration file is prepared to include the desired software and hardware configuration for a virtual machine that will run the user's software module. This may include how much RAM (random access memory) is to be made available to the virtual machine, how many processor cores (or processors) are to be allocated/made available to the virtual machine, how many GPUs are dedicated for that virtual machine, and, in some implementations that use a multi-tasking environment, what priority the software module's processes are to be given. In addition to this, the configuration file may also include ranges for various parameters that the software module may required. As an example, the software module may be an implementation of a neural network and, as such, the various nodes in the neural network will require hyper parameter values. The configuration file may include ranges for the various hyper parameters for the various nodes in the neural network.

In cooperation with the configuration file, the process agent operates to perform the configuration of an execution environment based on the contents of the configuration file. The process agent thus reads the contents of the configuration file and, as necessary, provisions one or more execution environments based on those contents. In addition, the process agent actually launches the software module uniquely associated with the configuration file and, again, where necessary, uses the parameter values in the configuration file for the relevant components of the software module. It should be clear that the configuration file may also contain parameters such as how many trials/tests/implementations of the software module are to be executed. The process agent thus takes these trial parameters and provisions the necessary number of execution environments to run the necessary number of instances of the software module in parallel. As an example, if the configuration file notes that five instances of the software module are required, with each instance having a specific set of parameters to be used, the process agent would configure and launch five identical execution environments, each of which would be executing the software module with the relevant parameters.

In addition to the above, the process agent can also receive and collate whatever results are produced by the various instances of the software module being tested and/or developed. This includes performance data for the variously configured instances (by way of the parameters) of the software module. By doing so, the process agent can gather, collate, and rank (by performance results) the various results. The process agent can thus determine which parameters used produced the best performing configuration for the software module. These results and rankings can then be presented to the user and, if necessary or desired, the user can rewrite/amend the configuration file so that the optimum parameters are in the configuration file.

For clarity, the concept of an execution environment controlled, provisioned, and launched by the configuration file and the process agent includes isolated resources (e.g. CPU, RAM, GPU, network adaptor) executing on a platform-independent environment capable of exposing those resources to a set of user defined programs. The term "execution environment" includes examples such as virtual machines, process virtual machines, docker containers, and full virtualization or emulation of a physical machine. Thus, when the process agent launches an execution environment, this may include launching a specifically provisioned virtual machine, an emulation of a physical machine (provisioned with specific resources), or simply launching a specific software environment provisioned with specific resources available to the user programs (i.e. the software modules).

It should be clear that the use of the configuration file and the process agent also provides an additional advantage. Once the optimum (or near optimum) parameters have been found for the software module and have been entered into the configuration file, the file can be stored in data storage. Whenever the software module has to be executed or implemented again, the process agent can simply retrieve the configuration file from data storage and use the exact same hardware and software configuration as had been found to be optimal for the software module. As well, the parameters that have been found to provide the best performance for the software module (and which are now part of the configuration file) are used. This ensures that, when an implementation of the software module is used, the optimum configuration is used. This also ensures that, if a researcher or developer needs to rerun the software module, the version used is the one that produced the best performance results. Also, this ensures that the conditions surrounding the hardware and software configuration for the software module are the same as in the previous times that software module was implemented. The researcher/developer no longer needs to make careful notes as to which configuration was used for which experiment/version as all the versions of the software module will be run on the same hardware and software configuration. However, the configuration of the software module need not be exclusively based on the past history of the execution of that software module. The configuration and parameters in the configuration file may also be based on the specific needs of the software module as well as any model that the software module may implement.

It should be noted that, for ease of identifying which configuration file is associated with which software module, the configuration file can be uniquely associated with the software module. This can be done by way of a unique identifying code embedded within both the configuration file and the software module. Thus, prior to implementing the software module, the process agent can check the software module and search a data storage to determine if a configuration file with the same identifying code is present. If such a configuration file is present, then this configuration file is retrieved, and its configuration and parameters are then implemented or used with an execution environment that will run the software module.

To ensure that the system of the present invention is easy to use, the process agent and the configuration file should be agnostic as to the characteristics of software module. This means that the software module can be developed/created using TensorFlow, Python, Torch, or any other suitable system and/or programming language. Preferably, the configuration file will contain an indication as to the type/flavor of system used to create the software module. This indication can then be used by the process agent to ensure that the parameters within the configuration file are suitable for use with that specific system. As well, this indication can be used by the process agent to ensure that the necessary libraries and supporting resources for that system are available to the software module. In one alternative, the configuration file may also contain and indication as to libraries or other modules (i.e. libraries or other modules that are not part of a standard set) that the software module may require for execution/implementation. This can then be used by the process agent to ensure that these libraries or modules are made available and accessible to the various virtual machines that are launched by the process agent. It should also be clear that the process agent, in one implementation, is a virtual machine that launches other virtual machines (or jobs or provisions other forms of execution environments) based on the functionality of the system as a whole as described herein. Alternatively, the process agent may be a standalone sub-system that launches virtual machines or provisions execution environments. As described herein, the process agent (whether as a virtual machine or a standalone subsystem or process) oversees the configuration, provisioning, and execution/launching of execution environment based on the content in the configuration file. The process agent may reside/launch in one server/cluster to launch/control virtual machines on other servers/clusters or the process agent and the execution environments it launches may all reside on the same server/cluster.

For an implementation that is specific to neural network-based software modules, the configuration file may include ranges of values for use as hyper parameters by the neural network. The values may then be used as a basis for the process agent to launch multiple instances of the software module (i.e. multiple instances of the neural network with each instance having a different set of hyper parameters based on the range given in the configuration file). In doing so, the process agent thus causes multiple parallel instances of the software module to execute on identical virtual machines/execution environments. While these multiple instances of the software module may execute simultaneously in parallel, depending on the implementation of the system, the process agent may configure the various virtual machines/execution environments to operate either in sequence or in staggered parallel or simultaneously in parallel.

In one variant of the present invention, the system may, based on the history of the execution of a software module or modules, determine the optimum configuration for these module or modules regardless of what is in the configuration file for those modules. In one implementation, if there have been enough executions of a specific module (the threshold being a configurable variable), the system feeds the data of those executions to a machine learning model to determine the optimum for one or more configuration parameters. Then, subsequent executions of that specific module will be provisioned or configured using those one or more optimal parameters. As an example, after 100 executions of a software module, for which the configuration file lists a provisioning of 5 GPUs for the process, the execution data is sent to a machine learning system. If the machine learning system then determines (from the execution data) that, while 5 GPUs have been provisioned, the specific module only really uses 3 of those GPUs, then subsequent executions of that specific module will be configured for 3 GPUs instead of the 5 GPUs listed in the configuration file. The system can thus predictively determine the resource consumption of the software module based on a sufficient amount of execution data for that software module. The predicted consumption can then be used to provision one or more future executions of the software module with the goal of optimizing or reducing the resource consumption of the module. The system can also determine what the highest level of minimum amount of resources will be needed for an execution such that the software module does not run out of resources.

Referring to FIG. 1, a block diagram of the components of the system according to one aspect of the present invention is illustrated. The system 10 includes a configuration file 20 and a process agent 30. The process agent 30 operates in conjunction with a computer system 40 to provision, configure, and launch one or more virtual machines/execution environments 50 based on the configuration parameters set out in the configuration file 20. After the various execution environments have been launched, the configuration file 20 can be stored in data storage 60 for later use. The configuration file 20 can be retrieved from data storage 60 by the process agent 30 when the software module needs to be re-run or re-implemented.

As noted above, performance metrics for the software modules that have been launched can be sent to the process agent for collection, collation, and analysis. Once the optimal operating parameters for the software module have been determined, whether automatically by the process agent's analysis of the performance metrics or manually by the user analyzing and selecting parameters for use by the software module, these parameters can then be included in the configuration file stored in data storage. This ensures that any future execution or implementation of the software module will be with the use of the optimal parameters now stored in the configuration file.

From the above, the system can also automatically determine preferred optimal settings and parameters based on the collected execution data for the software module. Using a machine learning model or any other suitable data analysis model, the system analyzes a suitable number of execution datasets for the software module and, based on the results of this analysis, the system can predict the optimal parameters and settings for the module. These parameters and settings can then be used in lieu of the parameters in the configuration file as necessary. As noted above, this capability allows the researcher or user to ensure that future executions of the software module are optimized and to ensure that minimal resources are used while ensuring that the software module does not run out of resources.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for provisioning and launching a plurality of instances of a software module implementing a neural network, the system comprising:
   a data storage adapted to store a configuration file detailing a hardware and software configuration for use in implementing said plurality of instances of said software module;
   a process agent module for use in configuring at least one computer system to implement said plurality of instances of said software module, said process agent module using said configuration file to configure said at least one computer system;
   at least one processor operatively connected to the data storage and to the process agent module; and
   a non-transitory computer-readable medium storing code instructions that are executable by the at least one processor for launching said plurality of instances of said software module;
   wherein:
      said configuration file is stored in the data storage such that said file is retrievable so that every implementation of said software module uses said configuration file;
      said configuration file is uniquely identified by an identifier, said identifier being uniquely associated with said software module;
      said process agent module selects parameters for use by said software module based on outputs produced by testing at least a subset of said plurality of instances of said software module; and
      each one of said plurality of instances of said software module uses a different set of hyper parameter values for the neural network.

2. The system according to claim 1, wherein said configuration file contains a range of hyper parameter values for said neural network, and wherein each of the different sets of hyper parameter values is within the range of hyper parameter values.

3. The system according to claim 1, wherein said configuration file causes said process agent module to launch said plurality of instances of said software module.

4. The system according to claim 1, wherein each instance of said software module produces a respective output that is sent to said process agent module.

5. The system according to claim 4, wherein said process agent module assesses said outputs of said plurality of instances of said software module and determines a desired set of hyper parameter values for said neural network based on said outputs of said plurality of instances of said software module.

6. The system according to claim 1, wherein said configuration file contains a range of values to be used as parameters for said software module, said parameters being values which affect a performance of said software module.

7. The system according to claim 1, wherein each one of said plurality of instances of said software module uses a different set of parameter values.

8. A system for launching a plurality of instances of a software module, the system comprising:
   a data storage adapted to store a configuration file detailing configurations for use in implementing said plurality of instances of said software module;
   a process agent module for use in configuring at least one computer system to implement said plurality of instances of said software module, said process agent module using said configuration file to configure said at least one computer system; and
   at least one processor operatively connected to the data storage and to the process agent module; and
   a non-transitory computer-readable medium storing code instructions that are executable by the at least one processor for launching said plurality of instances of said software module;
   wherein:
      said configuration file is uniquely identified by an identifier, said identifier being uniquely associated with said software module;
      said process agent module is adapted to select parameters for use by said software module based on outputs produced by testing at least a subset of said multiple instances of said software module; and
      each instance of said software module uses a different set of parameter values.

9. The system according to claim 8, wherein said configuration file is stored in the data storage such that said file is retrievable such that every implementation of said software module uses said configuration file.

10. The system according to claim 8, wherein said configuration file contains a range of values to be used as said parameters for said software module, wherein each of the different sets of parameter values is within the range of values, and wherein said parameters are values which affect a performance of said software module.

11. The system according to claim 8, wherein each instance of said software module produces a respective output that is sent to said process agent module.

12. The system according to claim 11, wherein said process agent module assesses said outputs of said plurality of instances of said software module and determines a desired set of parameter values for said software module based on said outputs of said multiple instances of said software module.

13. A method of launching a plurality of instances of a software module implementing a neural network, the method comprising:

providing a configuration file detailing configurations for use in implementing said plurality of instances of said software module;

providing an identifier that uniquely identifies said configuration file, said identifier being uniquely associated with said software module;

configuring, by a process agent module, at least one execution environment to implement said plurality of instances of said software module based, at least in part, on said configuration file;

launching said plurality of instances of said software module; and selecting, by the process agent module, parameters for use by said software module based on outputs produced by testing at least a subset of said plurality of instances of said software module, wherein:

said configuration file is stored such that said configuration file is retrievable by every instance of said plurality of instances of said software module, and each one of said plurality of instances of said software module uses a different set of hyper parameter values for the neural network.

14. The method according to claim 13, wherein the configuration file comprises a range of values to be used as hyper parameter values of said software module, and wherein each of the different sets of hyper parameter values is within the range of hyper parameter values.

15. The method according to claim 13, wherein said configuration file causes said process agent module to launch said plurality of instances of said software module.

16. The method according to claim 13, wherein each instance of said software module produces a respective output that is sent to said process agent module.

17. The method according to claim 16, wherein said process agent module assesses said outputs of said plurality of instances of said software module and determines a desired set of hyper parameter values for said neural network based on said outputs of said plurality of instances of said software module.

18. The method according to claim 13, wherein said configuration file contains a range of values to be used as parameters for said software module, said parameters being values which affect a performance of said software module.

19. The method according to claim 13, wherein each one of said plurality of instances of said software module uses a different set of parameter values.

* * * * *